US009664267B2

(12) United States Patent
Rousseau et al.

(10) Patent No.: US 9,664,267 B2
(45) Date of Patent: May 30, 2017

(54) LINEAR ACTUATOR FOR MOTION SIMULATOR

(71) Applicant: D-BOX TECHNOLOGIES INC, Longueuil (CA)

(72) Inventors: Robert Rousseau, Longueuil (CA); Steve Boulais, Longueuil (CA); Pierre Senecal, Longueuil (CA)

(73) Assignee: D-BOX TECHNOLOGIES INC, Québec (CA)

( * ) Notice: Subject to any disclaimer, the term of this patent is extended or adjusted under 35 U.S.C. 154(b) by 0 days.

(21) Appl. No.: 14/648,113

(22) PCT Filed: Dec. 2, 2013

(86) PCT No.: PCT/US2013/072605
§ 371 (c)(1),
(2) Date: May 28, 2015

(87) PCT Pub. No.: WO2014/085803
PCT Pub. Date: Jun. 5, 2014

(65) Prior Publication Data
US 2015/0316130 A1    Nov. 5, 2015

Related U.S. Application Data

(60) Provisional application No. 61/731,578, filed on Nov. 30, 2012.

(51) Int. Cl.
*F16H 1/24* (2006.01)
*F16H 25/20* (2006.01)
*F16D 3/68* (2006.01)

(52) U.S. Cl.
CPC ............... *F16H 25/20* (2013.01); *F16D 3/68* (2013.01); *F16H 2025/2031* (2013.01); *F16H 2025/2075* (2013.01); *Y10T 74/18576* (2015.01)

(58) Field of Classification Search
CPC .... F16H 25/20; F16H 3/68; F16H 2025/2031; F16H 2025/2075
(Continued)

(56) References Cited

U.S. PATENT DOCUMENTS 2,247,562 A    5/1940  Santen
4,307,799 A   12/1981  Zouzoulas
(Continued)

FOREIGN PATENT DOCUMENTS

CN         102281930 A        12/2011
JP    WO 2012077213 A1 *   6/2012   ......... F16H 25/2021
WO       2012077213 A1      6/2012

OTHER PUBLICATIONS

International Preliminary Report on Patentability for corresponding application PCT/US2013/072605 filed Dec. 2, 2013; Issued Jun. 11, 2015.

(Continued)

*Primary Examiner* — William Kelleher
*Assistant Examiner* — Zakaria Elahmadi
(74) *Attorney, Agent, or Firm* — Cantor Colburn LLP

(57) ABSTRACT

A linear actuator comprising a motor having an output shaft. A casing of the motor has an inner cavity defining a joint surface. A threaded shaft is within the inner cavity of the casing, and a bearing within the inner cavity. A coupling assembly couples the output shaft to the threaded shaft, and has a first coupling component receiving the rotational output from the motor, and a second coupling component coupled to the first coupling component for transmission of the rotational output to the threaded shaft. A substantial portion of a coupling is in an axial section of the linear actuator delimited by a proximal and distal surface of the bearing. A sliding tube is within the inner cavity and translates relative to the casing. A traveling nut is connected (Continued)

to the sliding tube for moving therewith for converting a rotational motion of the threaded shaft into a translation of the sliding tube.

14 Claims, 5 Drawing Sheets

(58) Field of Classification Search
USPC .......................... 74/89.23, 89.38, 89.4, 424.7
See application file for complete search history.

(56) References Cited

U.S. PATENT DOCUMENTS

| | | | |
|---|---|---|---|
| 5,053,685 A | 10/1991 | Bacci | |
| 5,505,661 A | 4/1996 | Habicht | |
| 5,511,439 A | 4/1996 | Las Navas Garcia | |
| 6,540,426 B2 | 4/2003 | Cloyd | |
| 6,585,515 B1 | 7/2003 | Roy | |
| 7,033,177 B2 | 4/2006 | Kim | |
| 7,141,752 B2 | 11/2006 | Hochhalter | |
| 7,793,561 B2 | 9/2010 | Greilinger | |
| 7,934,773 B2 | 5/2011 | Boulais | |
| 2002/0109427 A1 | 8/2002 | Hochhalter | |
| 2005/0046291 A1 | 3/2005 | Suzuki | |
| 2006/0081078 A1 | 4/2006 | Nagai | |
| 2006/0144179 A1 | 7/2006 | Greilinger | |
| 2009/0050451 A1* | 2/2009 | Sorensen | F16H 25/20 200/61.85 |
| 2012/0168593 A1 | 7/2012 | Mekid | |
| 2012/0227522 A1* | 9/2012 | Wu | F16H 25/20 74/89.14 |
| 2012/0297908 A1* | 11/2012 | Bourgoine | F16H 25/20 74/89.23 |
| 2013/0283947 A1 | 10/2013 | Yamada | |
| 2013/0285494 A1 | 10/2013 | Iversen | |
| 2014/0013878 A1 | 1/2014 | Kollreider | |
| 2015/0155757 A1 | 6/2015 | Hidaka | |
| 2015/0222168 A1 | 8/2015 | Sakai | |

OTHER PUBLICATIONS

International Preliminary Report on Patentability for corresponding application PCT/US2013/072609 filed Dec. 2, 2013; Issued Jun. 11, 2015.

International Preliminary Report on Patentability for corresponding application PCT/US2013/072612 filed Dec. 2, 2013; Issued Jun. 11, 2015.

International Search Report for corresponding application PCT/US2013/072312 filed Dec. 2, 2013; Mail date Apr. 18, 2014.

International Search Report for corresponding application PCT/US2013/072605 filed Dec. 2, 2013; Mail date Apr. 28, 2014.

International Search Report for corresponding application PCT/US2013/072609 filed Dec. 2, 2013; Mail date Apr. 28, 2014.

Written Opinion for corresponding application PCT/US2013/072312 filed Dec. 2, 2013; Mail date Apr. 18, 2014.

Written Opinion for corresponding application PCT/US2013/072605 filed Dec. 2, 2013; Mail date Apr. 28, 2014.

Written Opinion for corresponding application PCT/US2013/072609 filed Dec. 2, 2013; Mail date Apr. 28, 2014.

* cited by examiner

LINEAR ACTUATOR FOR MOTION SIMULATOR

CROSS-REFERENCE TO RELATED APPLICATION

The present application claims priority on U.S. Provisional Application Ser. No. 61/731,578, filed on Nov. 30, 2012.

FIELD OF THE APPLICATION

The present application relates to linear actuators as used with motion simulators or in motion simulation, for instance to displace an occupant or occupants of a platform in synchrony with a sequence of video images.

BACKGROUND OF THE ART

In the video and televised entertainment industry, there is an increasing demand for enhancing the viewing experience of a viewer. Accordingly, there has been numerous innovations to improve the image and the sound of viewings. Motion simulation has also been developed to produce movements of a motion platform (e.g., a seat, a chair) in synchrony with sequences of images of a viewing. For instance, U.S. Pat. Nos. 6,585,515 and 7,934,773 are two examples of systems that have been created to impart motion to a seat, to enhance a viewing experience.

Electro-mechanical linear actuators are commonly used in such motion platforms. These linear actuators must often be capable of producing low and medium amplitude outputs, at low or medium frequency, for a high number of strokes. Moreover, these linear actuators must support a portion of the weight of a platform and its occupant(s). In some applications such as actuated seats, the linear actuators are limited in vertical dimension, as the space between a seat and the ground is within standards. As a result, these linear actuators are often bulky, prone to failure and have a limited stroke.

SUMMARY OF THE APPLICATION

It is therefore an aim of the present disclosure to provide a linear actuator that addresses issues associated with the prior art.

Therefore, in accordance with the present application, there is provided a linear actuator comprising: a motor having an output shaft for producing a bi-directional rotational output; a casing connected to the motor at a proximal end, the casing having an inner cavity defining a joint surface; a threaded shaft within the inner cavity of the casing; at least one bearing within the inner cavity and adjacent to the proximal end of the casing; a coupling assembly for coupling the output shaft of the motor to the threaded shaft, the coupling assembly having at least a first coupling component receiving the rotational output from the motor, and at least a second coupling component coupled to the first coupling component for transmission of the rotational output to the threaded shaft, a substantial portion of a coupling between the first and the second coupling components being in an axial section of the linear actuator delimited by a proximal surface and a distal surface of the at least one bearing; a sliding tube in sliding arrangement with the inner cavity of the casing for moving in translation relative to the casing; and a traveling nut connected to the sliding tube for moving therewith, the traveling nut being operatively engaged to the threaded shaft for converting a rotational motion of the threaded shaft into a translation of the sliding tube.

Further in accordance with the present disclosure, the first coupling component has a male connector in the coupling, and the second coupling component is a female connector in the coupling.

Still further in accordance with the present disclosure, the second coupling component is connected to a proximal end of the threaded shaft to rotate therewith.

Still further in accordance with the present disclosure, the second coupling component has a cylindrical head, a cylindrical periphery of the cylindrical head being against a surface of an inner race of the bearing.

Still further in accordance with the present disclosure, the cylindrical head has an inner cavity proximally opened and receiving therein a portion of the first coupling component.

Still further in accordance with the present disclosure, the coupling comprises a pair of fingers in the first coupling component, the pair of fingers projecting into the inner cavity.

Still further in accordance with the present disclosure, the coupling comprises a cross-shaped interface between the pair of fingers and a pair of protrusions in the cavity.

Still further in accordance with the present disclosure, the cross-shaped interface has a hardness lower than that of the fingers and that of the protrusions.

Still further in accordance with the present disclosure, a substantial portion of the cavity and of the fingers is in an axial section of the linear actuator delimited by a proximal surface and a distal surface of the at least one bearing.

Still further in accordance with the present disclosure, a flange is at a distal end of the cylindrical head and a channel adjacent to a proximal end of the cylindrical head, with a retaining ring releasably received in the channel, whereby the at least one bearing is retained between the flange and the retaining ring.

Still further in accordance with the present disclosure, a tubular shaft support projects distally from the cylindrical head, the tubular shaft support receiving therein a proximal end of the threaded shaft.

Still further in accordance with the present disclosure, a pin rotatably locks the tubular shaft support to the proximal end of the threaded shaft.

Still further in accordance with the present disclosure, connection means are at the distal end of the sliding tube for securing same to a base or the ground.

DESCRIPTION OF THE PREFERRED EMBODIMENTS

Figure 1:
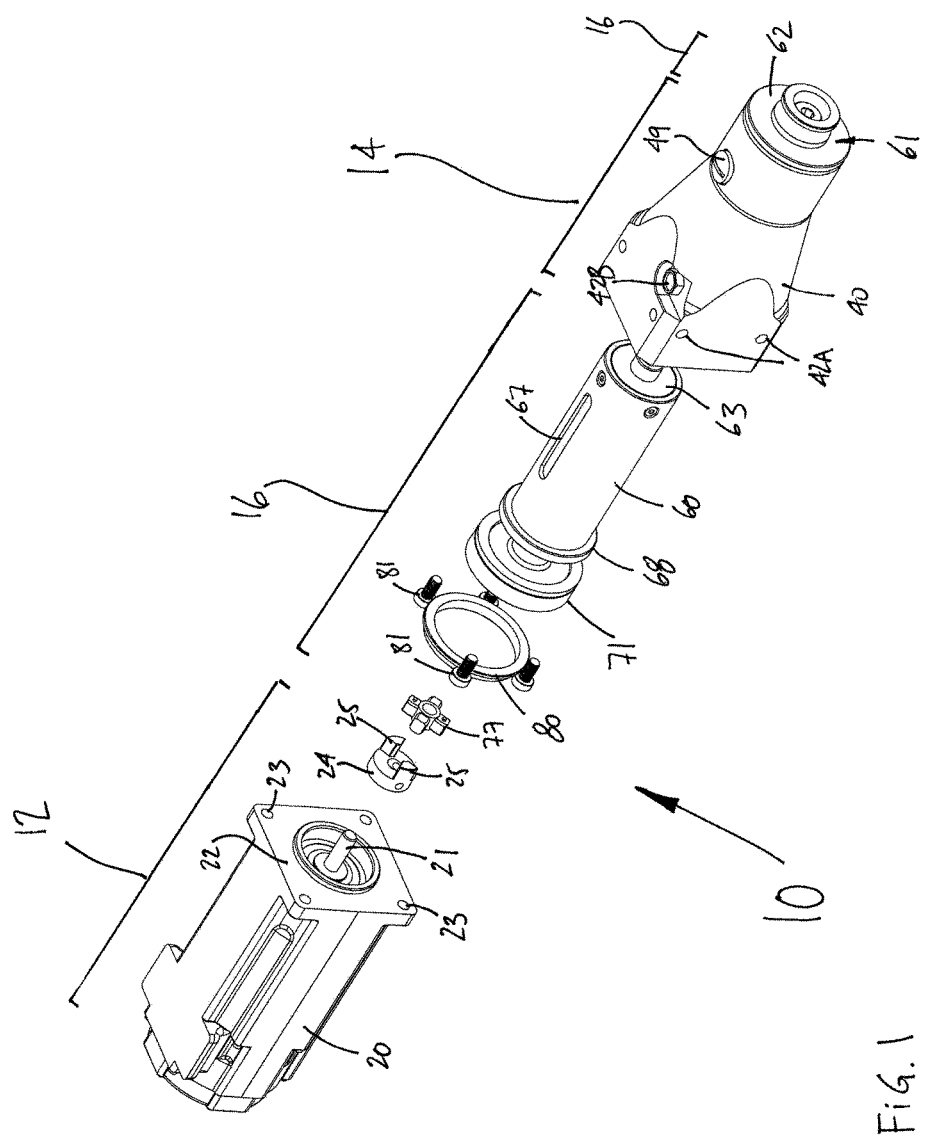
FIG. 1 is an exploded view of a linear actuator for motion simulators in accordance with the present disclosure.
Figure 2:
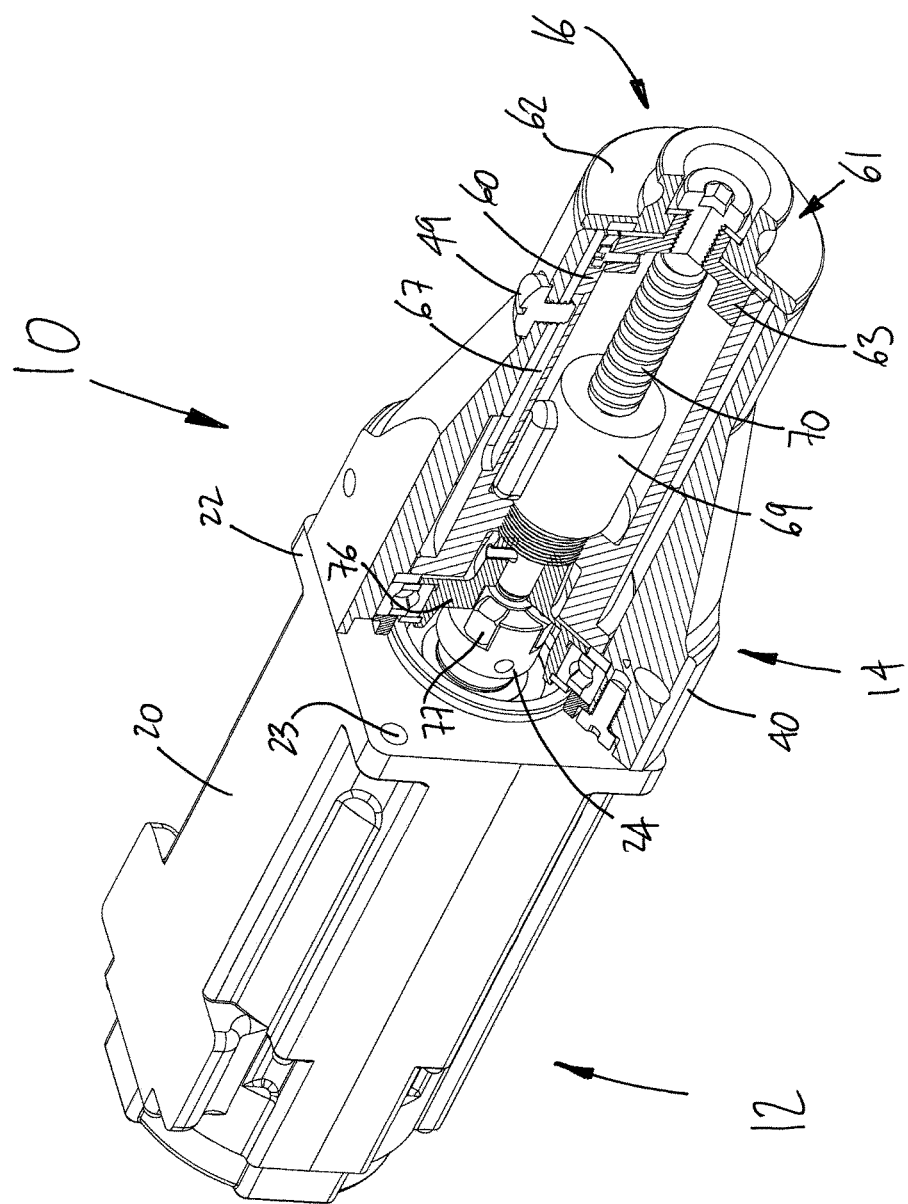
FIG. 2 is a partly sectioned view of the linear actuator of FIG. 1, in a retracted condition.

Referring to the drawings and more particularly to FIGS. 1 and 2, there is illustrated at 10 a linear actuator of the type used for motion simulators. The linear actuator 10 is well suited to be used between the ground and a motion platform (i.e., support surface, chair, seat, flight simulator/compartment, etc) to displace the motion platform in synchrony with a sequence of images and/or sound, for instance part of a motion picture, a televised event, a video, a video game, a simulation, haptic event, etc. The linear actuator 10 of the illustrated embodiments is an electro-mechanical linear actuator that is driven by a motion controller, or any other appropriate and adapted source of motion signals (e.g., media player, D-cinema projector, internet, etc), i.e., code representing specific motions to be performed. The motion signal is sent to the liner actuator 10 in a suitable format to drive a motor thereof. In an embodiment, at least two of the actuator 10 are used concurrently to support and displace a seat relative to the ground. The linear actuator 10 therefore produces a translational output, along an axial direction thereof. When reference is made hereinafter to the axial direction, it will refer to the longitudinal axis of the linear actuator 10, unless stated otherwise.

The linear actuator 10 is an assembly of three groups (i.e., three portions, three sub-assemblies, etc), namely a motor group 12, a structural group 14 and a driven group 16.

The motor group 12 receives motion signals in electric format, and produces rotational motions corresponding to the motion signals received. The motor group 12 is therefore connected to a source of motion signals or like electronic equipment.

The structural group 14 houses the driven group 16, and operatively connects the motor group 12 to the driven group 16. Moreover, the structural group 14 may be the interface between the linear actuator 10 and the motion platform, as in the illustrated embodiment.

The driven group 16 converts the rotational motions from the motor group 12 into linear motions, and is the output of the linear actuator 10. The driven group 16 may be the interface between the linear actuator 10 and the ground or a base, as in the illustrated embodiment.

Motor Group 12

Referring to FIGS. 1 and 2, components of the motor group 12 are shown in greater detail. For simplicity purposes, components of the motor group 12 are numbered between 20 and 25.

The motor group 12 has an electric motor 20. The electric motor 20 is a bi-directional motor of the type receiving an electrical motion signal, to convert the signal in a rotational output proportional to the motion signal, in either circular directions, in direct drive. Accordingly, the electric motor 20 has an output shaft 21. By way of example, the electric motor 20 is a Danaher motor. This type of electric motor is provided as an example, and any other appropriate type of motor may be used. The output shaft 21 may project in the axial direction.

A body of the motor 20 has a connection flange 22 adjacent to the output shaft 21. The connection flange 22 defines throughbores 23 (e.g., tapped throughbores), by which fasteners such as bolts (not shown), washers, and the like may be used to connect the motor 20 to the structural group 14. Any appropriate type of connection means may be used as alternatives to the flange 22 and fasteners.

In the illustrated embodiment, a coupling component, namely motor coupler 24, is connected to the output shaft 21 so as to be integral therewith (e.g., by way of a set screw, etc). Hence, the motor coupler 24 rotates with the output shaft 21. The motor coupler 24 will be coupled to the driven group 16 as described hereinafter, or may alternatively be part of the driven group 16. For being coupled, the coupler 24 has a pair of fingers 25 projecting in the axial direction.

The fingers 25 are one contemplated configuration for coupling the coupler 24 to the driven group 16.

Structural Group 14

Referring to FIGS. 1 to 5, components of the structural group 14 are shown in greater detail. For simplicity purposes, components of the structural group 14 are numbered between 40 and 49.

Figure 5:
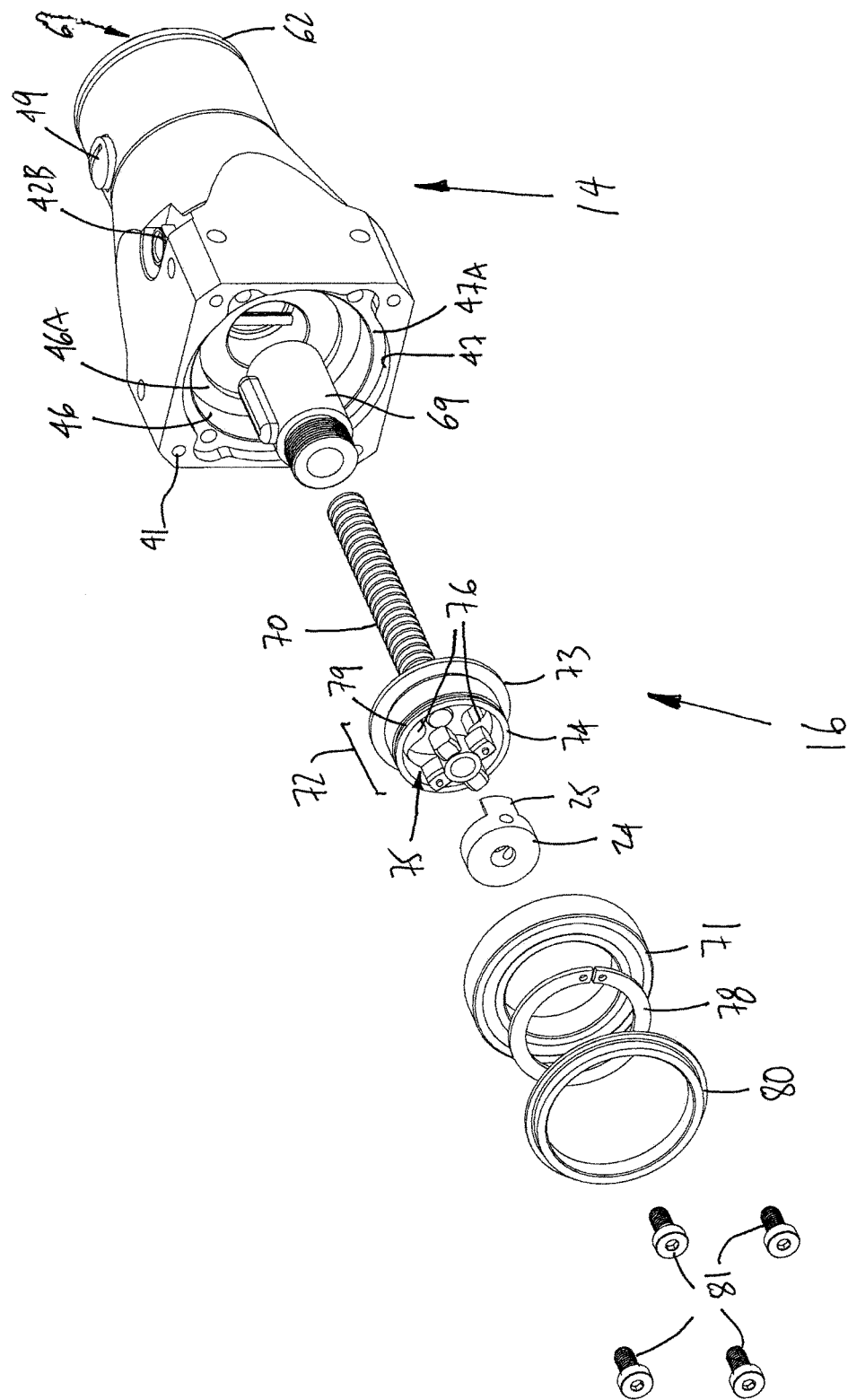
FIG. 5 is a exploded view of the structural group and the driven group of the linear actuator of FIG. 1.

The structural group 14 comprises a casing 40, also known as a cover, housing, or the like. In the illustrated embodiment, the casing 40 is a monolithic piece. The casing 40 is a main structural component of the linear actuator 10, as it interfaces the motor group 12 to the driven group 16, and may also interface the linear actuator 10 to a motion platform. As seen in FIG. 5, tapped connection bores 41 are located at a proximal end face of the casing 40, and are circumferentially spaced apart so as to be aligned with the throughbores 23 of the electric motor 20, when the motor 20 is connected to the proximal end of the casing 40, in the manner shown in FIG. 2. As the casing 40 may be the interface of the linear actuator 10 with the motion platform, other connection means may be provided on the surface of the casing 40, such as tapped bores 42A, and a threaded fastener and nut 42B.

Referring to FIGS. 2-5, the casing 40 defines an inner cavity 43 that houses a part of the driven group 16. The inner cavity 43 may be segmented in various sections. One such section is delimited by a joint surface 44, and an open distal end 44A of the casing 40. The joint surface 44 is the surface against which a moving component of the driven group 16 will slide.

A subsequent section is delimited by a clearance surface 45 and separated from the joint surface 44 by a clearance shoulder 45A. The clearance surface 45 forms a void in which components of the driven group 16 may move without obstructions.

Yet another subsequent section is delimited by a seat surface 46 and is separated from the clearance surface 45 by a seat shoulder 46A. The seat surface 46 forms a seat for a bearing of the driven group 16, as described hereinafter.

A final section is open to the proximal end of the casing 40, and is delimited by another clearance surface 47. The clearance surface 47 is separated from the seat surface 46 by a clearance shoulder 47A. It is observed that the four different sections have sequentially increasing diameters from a distal-most section, i.e., the section of the joint surface 44, to a proximal-most section, i.e., the section of the clearance surface 47, whereby the inner cavity 43 may be machined from tooling inserted at a single end. Moreover, the sections may be concentric with one another.

Figure 3:
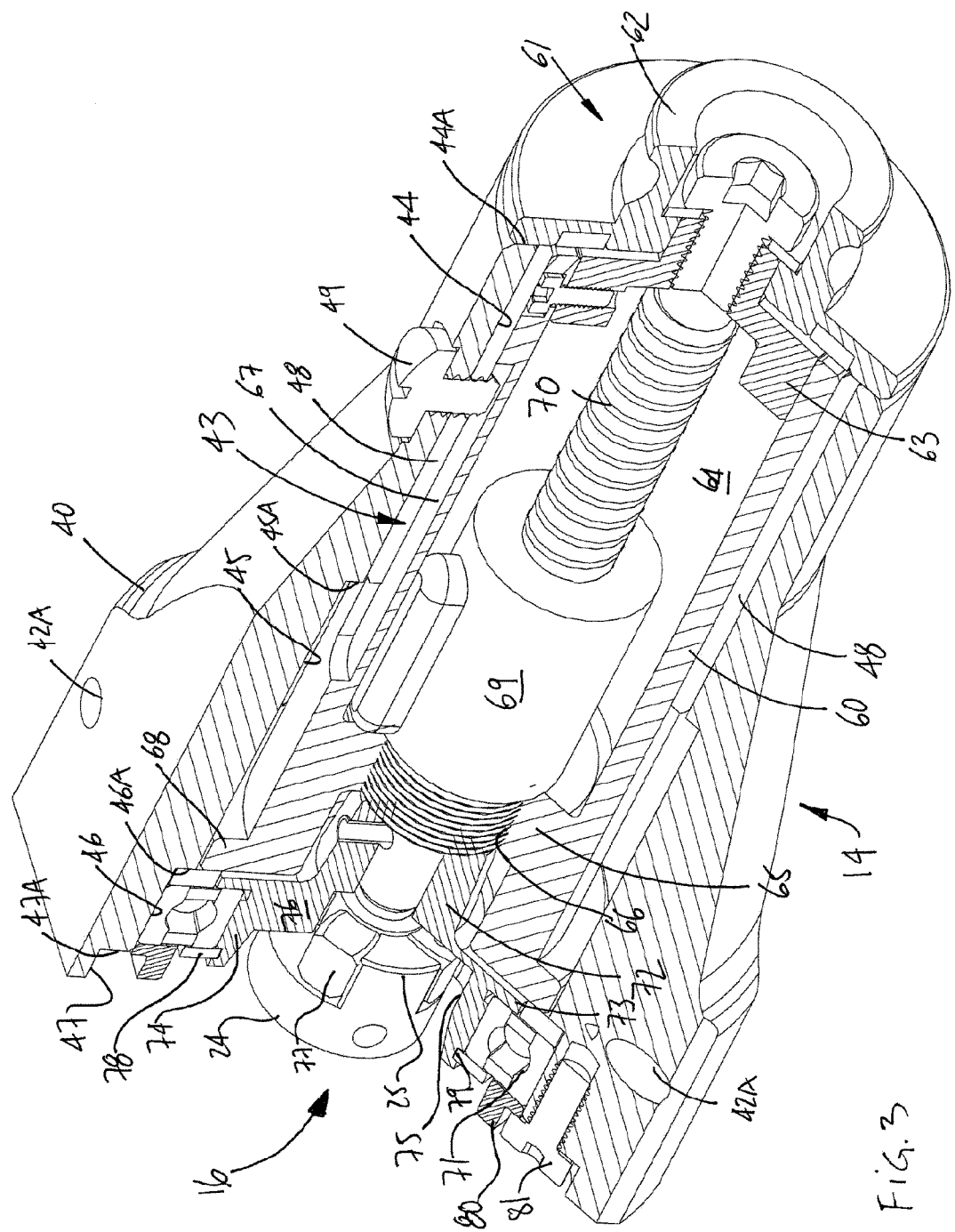
FIG. 3 is a sectioned view of a structural group and a driven group of the linear actuator of FIG. 1.
Figure 4:
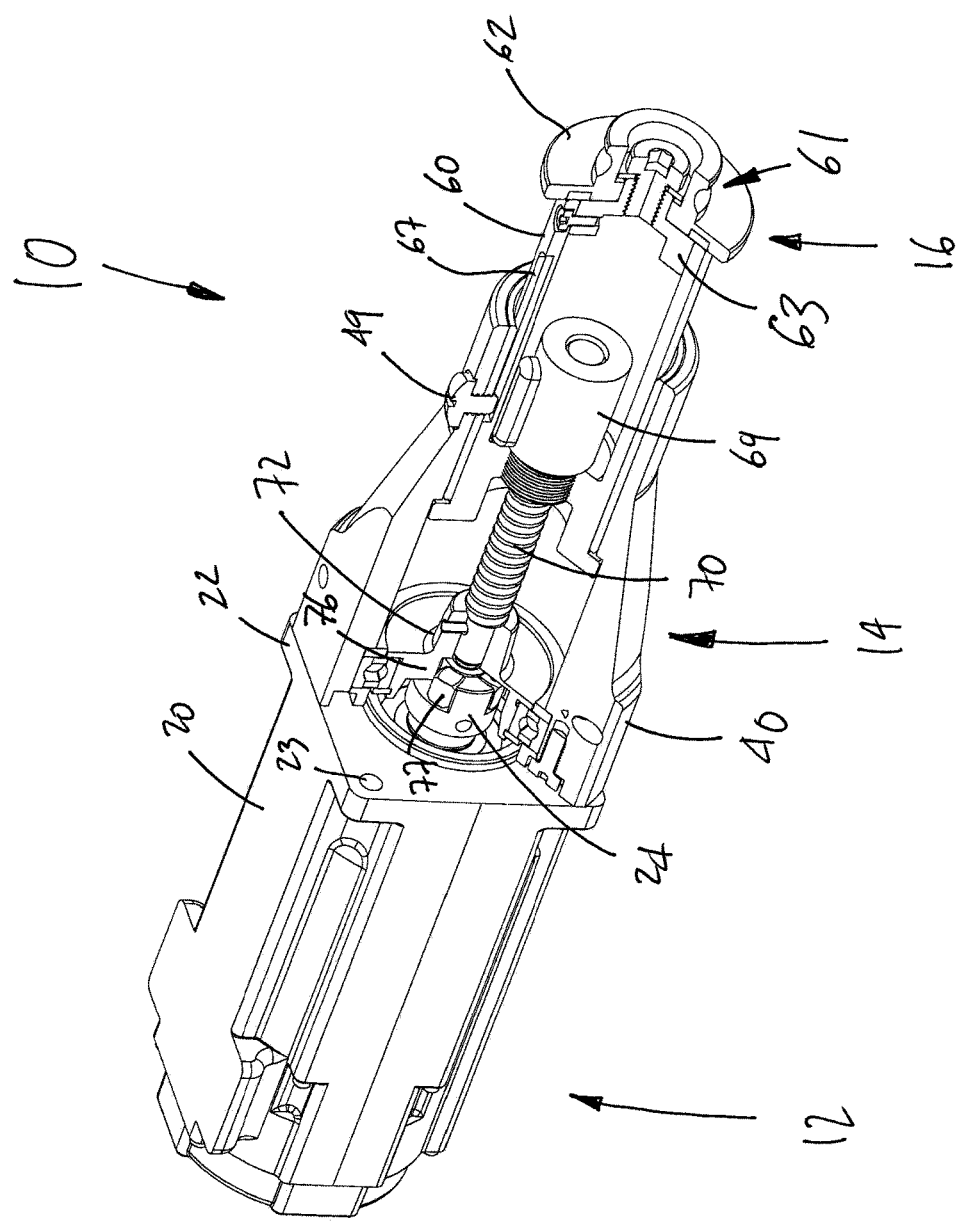
FIG. 4 is a partly sectioned view of the linear actuator of FIG. 1, in an extended condition.

Referring to FIGS. 2-4, a sleeve 48 may be fitted onto the joint surface 44 to act as an interface for a sliding component of the driven group 16, as described hereinafter. The sleeve 48 is hence made of a material having a relatively high hardness for a relatively low coefficient of friction, such as Igus® Iglide® material (e.g., A-500). Guide 49 projects through the joint surface 44 and into the inner cavity 43. The end of the guide 49 is within the inner cavity 43 of the casing 40, and will serve as guide for a sliding component of the driven group 16, to ensure linear motion, i.e., to serve as an anti-rotation guide for the sliding component of the driven group 16. Moreover, the guide 49 may act as a stopper to delimit the stroke of the linear actuator 10, although not in the illustrated embodiment. In the illustrated embodiment, the guide 40 is a bolt with its bolt head accessible from an exterior of the casing 40.

Driven Group 16

Referring to FIGS. 1 to 5, components of the driven group 16 are shown in greater detail. For simplicity purposes, components of the driven group 16 are numbered above 60.

The driven group 16 has a sliding tube 60, also known as a piston. The sliding tube 60 is the main moving component of the driven group. The sliding tube 60 is fitted within the inner cavity 43 of the casing 40, and is sized so as to be in sliding contact with the sleeve 48 on the joint surface 44. Hence, the sliding tube 60 may move in the axial direction in the inner cavity 43 of the casing 40, such that a distal end of the sliding tube 60 may project out of the distal end of the casing 40 by a variable distance. For instance, in FIG. 2, the sliding tube 60 is retracted within the casing 40 in a retracted condition of the linear actuator 10, whereas the sliding tube 60 is fully extended out of the casing 40 in FIG. 4, in an extended condition of the linear actuator 10.

In the illustrated, an interface 61 is therefore provided at a distal end of the sliding tube 60, outside of the casing 40. The interface 61 may be a ground or base interface if the linear actuator 10 is oriented with the interface 61 downward. For instance, the interface 61 may lie directly on the ground, or be a part of a joint. Alternatively, if the linear actuator 10 is oriented with the interface 61 upward, the interface 61 is connected to the motion platform (e.g., underside of a seat or seat frame), for instance by way of a joint. The interface 61 is shown in the figures as having a cap 62 with a tapped bore adapted to receive thereon any appropriate component to be used as part of a joint, directly on the ground, directly to a motion platform. The cap 62 is at an end of a support plug 63. The support plug 63 is partially received in an inner cavity 64 of the sliding tube 60, and may be secured to the sliding tube 60 by lateral screws, or the like. The cap 62 and the support plug 63 are one solution among many others that can be used as the interface 61 at the end of the sliding tube 60.

Referring to FIGS. 2-4, the inner cavity 64 is shown as extending the full length of the sliding tube 60. An inner wall 65 is located inside the inner cavity 64, and lies in a transverse plane relative to the axial direction. A central bore 66 is centrally located in the inner wall 65. The central bore 66 is shown as being tapped.

On an outer surface of the sliding tube 60, a guide channel 67 is formed. The guide channel 67 is parallel to the axial direction. In operation, the end of the guide 49 will be received in the guide channel 67. In the illustrated embodiment, the sliding tube 60 features a single guide channel 67. However, more of the guide channel 67 could be used, with a corresponding number of the guide 49.

The sliding tube 60 may define a flange 68 at its proximal end. During operation, the flange 68 is located in the inner cavity 43, within the section delimited by the clearance surface 45. The outer diameter of the flange 68 is smaller than the inner diameter of the inner cavity 43 at the clearance surface 45. Accordingly, in an embodiment, there is no contact between the clearance surface 45 and the flange 68. The flange 68 may prevent the sliding tube 60 from being inadvertently removed from the casing 40, for instance if the guides 49 are removed. The flange 68 may also come into abutment with the clearance shoulder 45A in a distal direction, to bound the extension of the sliding tube 60 relative to the casing 40, and with fixed components of the driven group 16 in a proximal direction, to limit the retraction of the sliding tube 60 in the casing 40.

A traveling nut 69 is secured to the sliding tube 60. In the illustrated embodiment, the traveling nut 69 has a threaded end by which it is screwingly connected to the tapped bore of the inner wall 65 of the sliding tube 60, so as to move integrally with the sliding tube 60. The traveling nut 69 may be any appropriate type of mechanism operating with a lead screw (i.e., threaded shaft) to convert a rotation of the lead screw into a translation of the sliding tube 60. For instance, the traveling nut 69 is a ball screw unit. One suitable ball screw unit is a NSK rolled ball screw with a return tube, such as a RNCT type ball nut. However, many other types of traveling nuts 69 are considered as alternatives to rolled ball screws. For instance, the traveling nut may be an integral part of the sliding tube 60 (e.g., a monolithic machined part)

Referring concurrently to FIGS. 2 to 5, a threaded shaft 70 (i.e., lead screw, bolt) is in operative engagement with the traveling nut 69. The threaded shaft 70 is coupled to the electric motor 20, to transmit the rotational output of the motor 20 to the sliding tube 60. The threaded shaft 70 has a helical raceway that is compatible with the traveling nut 69. As the traveling nut 69 is fixed to the sliding tube 60, and as the sliding tube 60 is limited to translational movements due to the interaction between the guides 49 and the guide channels 67, a rotation of the threaded shaft 70 results in a translation of the traveling nut 69.

The threaded shaft 70 is rotatably connected to the casing 40, to rotate about its longitudinal axis (substantially parallel to the axial direction), while being retained from translating. A bearing 71 is accordingly seated in the section of the casing 40 delimited by the seat surface 46, with the bearing 71 abutted against the shoulder 46A, for instance with a spacer ring 71A therebetween. The bearing 71 may be a ball bearing, a roller bearing, a ball-less bearing, or any appropriate type of bearing.

A shaft support 72 interconnects the shaft 70 to the bearing 71. In the illustrated embodiment, the shaft support 72 may be a monolithic piece of metal that is cast, molded and/or machined. The shaft support 72 has an annular body that receives a proximal end of the shaft 70. The shaft support 72 is fixed to the shaft 70, for instance by a set screw or rolled pin 72A radially arranged between the shaft 70 and the shaft support 72, whereby the shaft support 72 rotates with the shaft 70. The shaft support 72 has a distal flange 73 and a proximal head 74. The head 74 is another coupling component that has an outer diameter corresponding to the inner diameter of the inner race of the bearing 71, for the bearing 71 to be mounted thereon and to abut the flange 73. The dimensioning of the head 74 is selected so as to reach an appropriate fit with the bearing 71 (e.g., interference fit, force fit), to reduce or remove any play between the bearing 71 and the shaft support 72.

The head 74 has a cavity 75 proximally opened, and forming a shaft coupler, for being coupled to the motor coupler 24. A pair of protrusions 76 are in the open cavity 75 and will be coupled to the fingers 25 of the motor coupler of the motor 20, for transmission of a rotational output from the electric motor 20 to the shaft 70.

A joint interface 77 is received in the open cavity 75. The joint interface 77 is cross-shaped, and hence defines four clearances, two of which receive the fingers 25, and two of which receive the protrusions 76. The four clearances of the joint interface 77 are sized so as to minimize or prevent any play with the fingers 25 and the protrusions 76. However, the joint interface 77 is made of a relatively hard material, yet with a hardness lower than that of the metallic material used for the motor coupler 24 and the shaft support 72. For instance, the joint interface 77 is made of a high-density polymeric material. When the linear actuator 10 is assembled in the manner shown in FIGS. 1 to 5, the joint interface 77 is held captive in the open cavity 75, between the motor coupler 24 and the head 74, but is not secured to either. Hence, the joint interface 77 allows some freedom of alignment between the motor coupler 24 and the head 74, for instance if the output shaft 21 of the motor 20 and the threaded shaft 70 are not perfectly co-axially aligned. Hence, the joint interface 77 forms a universal-like joint between the motor coupler 24 and the shaft support 72. The head 74 acts as a female connector while the motor coupler 24 is the male connector, although it is considered to use the reverse set-up.

An external retaining ring 78 is received in a channel 79 on the outer surface of the head 74. The channel 79 is spaced apart from the flange 73 for the bearing 71 to be held axially captive between the flange 73 and the external retaining ring 78, with substantially no axial play. The external retaining ring 78 is one of a few contemplated solutions to secure the bearing 71 to the shaft support 72 into an integral unit, other solutions being a tapped ring, nut, etc.

As best seen in FIG. 3, the bearing 71, the head 74 and its open cavity 75, and the various components forming the joint between the output shaft 21 of the motor 20 and the threaded shaft 70, namely the fingers 25 of the motor coupler 24, the protrusions 76 and the joint interface 77 are all within the axial section of the casing 40 delimited by the seat surface 46 (or by the proximal and distal surfaces of the bearing 71. Stated differently, the male/female coupling between first and second coupling components, i.e., the coupler 24 and the head 74 is within the inner race of the bearing 71, resulting in an optimization of the space, in comparison to actuators in which the bearing and the coupling are not in a same axial section. This axial section is relatively narrow, as it is more or less equal to the thickness of the bearing 71. Moreover, the fingers 25, the bearing 71, the protrusions 76 and the joint interface 77 all lie in a common plane that is transverse to the axial direction of the linear actuator 10. The fingers 25, the head 74, the protrusions 76 and the joint interface 77 are all located in a center of the bearing 71.

An end ring 80 is positioned at the proximal end of the driven group 16, and abuts against the outer race of the bearing 71. The end ring 80 holds the various components of the driven group 16 captive in the casing 40. Fasteners 81, such as bolts, have their heads within the section of the casing 40 delimited by the clearance surface 47, and against the shoulder 47A. The heads of the fasteners 81 block the end ring 81 from moving out of the casing 40, in the axial direction.

Now that the various components of the linear actuator 10, an operation thereof is set forth.

The operation will refer to the linear actuator 10 as being oriented such that the interface 61 is facing the ground.

The linear actuator 10 is initially calibrated, in that the position of the sliding tube 60 is known relative to casing 40. This may be done by any appropriate method, including calibration movements when the linear actuator 10 is turned on, as controlled by a platform controller.

The electric motor 20 receives motion signals and will hence produce rotational outputs proportional to the motion signals, in the selected directions. The rotational outputs will be transmitted through the output shaft 21, to the threaded shaft 70 via the coupling therebetween.

The sliding tube 60 and traveling nut 69 will convert rotations of the threaded shaft 70 into a translation of the sliding tube 60 along the axial direction. As the sliding tube 60 is connected to the ground or a base, the resulting action will be a translational motion of the motor and casing 40 relative to the ground or a base. As the motion platform is connected to the motor 20 or the casing 40, the motion platform will move with the motor 20 and the casing 40. It is pointed out that additional degrees of freedom may be present between any of ground/base, the motor 20/casing 40, and the sliding tube 60, for instance by the presence of joints between the motion platform, the ground/base and the linear actuator 10.

In instances, the sliding tube 60 is connected to the motion platform while the motor 20 and the casing 40 are secured to the ground or to a base. In such a case, the motion platform will move with the sliding tube 60.

The invention claimed is:
1. A linear actuator comprising:
    a motor having an output shaft for producing a bi-directional rotational output;
    a casing connected to the motor at a proximal end, the casing having an inner cavity defining a joint surface;
    a threaded shaft within the inner cavity of the casing;
    at least one bearing within the inner cavity and adjacent to the proximal end of the casing;
    a coupling assembly for coupling the output shaft of the motor to the threaded shaft, the coupling assembly having at least a first coupling component receiving the rotational output from the motor, and at least a second coupling component coupled to the first coupling component for transmission of the rotational output to the threaded shaft, a substantial portion of a coupling between the first and the second coupling components being in an axial section of the linear actuator delimited by a proximal surface and a distal surface of the at least one bearing;
    a sliding tube in sliding arrangement with the inner cavity of the casing for moving in translation relative to the casing; and
    a traveling nut connected to the sliding tube for moving therewith, the traveling nut being operatively engaged to the threaded shaft for converting a rotational motion of the threaded shaft into a translation of the sliding tube.
2. The linear actuator according to claim 1, wherein the first coupling component has a male connector in the coupling, and the second coupling component is a female connector in the coupling.
3. The linear actuator according to claim 1, wherein the second coupling component is connected to a proximal end of the threaded shaft to rotate therewith.
4. The linear actuator according to claim 1, further comprising connection means at the distal end of the sliding tube for securing same to a base or the ground.
5. The linear actuator according to claim 1, wherein one of the first coupling component and the second coupling component has a cylindrical head, a cylindrical periphery of the cylindrical head being against a surface of an inner race of the bearing.
6. The linear actuator according to claim 5, wherein the second coupling component has said cylindrical head.
7. The linear actuator according to claim 6, the cylindrical head has an inner cavity proximally opened and receiving therein a portion of the first coupling component.
8. The linear actuator according to claim 7, wherein the coupling comprises a pair of fingers in the first coupling component, the pair of fingers projecting into the inner cavity.
9. The linear actuator according to claim 8, wherein the coupling comprises a cross-shaped interface between the pair of fingers and a pair of protrusions in the cavity.

10. The linear actuator according to claim 9, wherein the cross-shaped interface has a hardness lower than that of the fingers and that of the protrusions.

11. The linear actuator according to claim 8, wherein a substantial portion of the cavity and of the fingers is in an axial section of the linear actuator delimited by a proximal surface and a distal surface of the at least one bearing.

12. The linear actuator according to claim 6, further comprising a flange at a distal end of the cylindrical head and a channel adjacent to a proximal end of the cylindrical head, with a retaining ring releasably received in the channel, whereby the at least one bearing is retained between the flange and the retaining ring.

13. The linear actuator according to claim 6, further comprising a tubular shaft support projecting distally from the cylindrical head, the tubular shaft support receiving therein a proximal end of the threaded shaft.

14. The linear actuator according to claim 13, further comprising a pin rotatably locking the tubular shaft support to the proximal end of the threaded shaft.

\* \* \* \* \*